Figure 1:
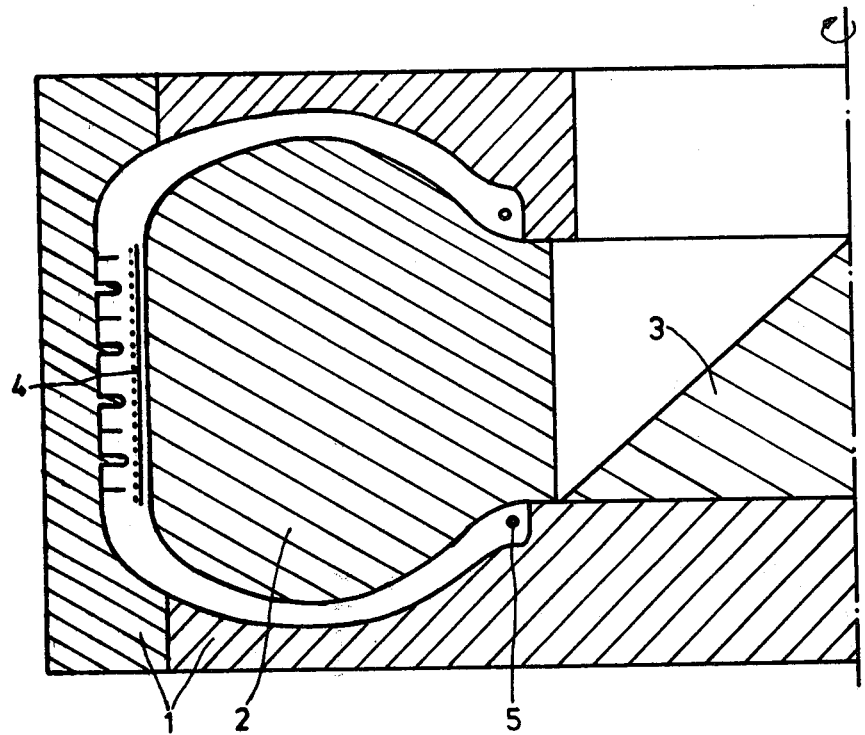

United States Patent [19]

Ganster et al.

[11] 4,309,378
[45] Jan. 5, 1982

[54] PROCESS FOR THE PRODUCTION OF PNEUMATIC TIRES HAVING PARTICULARLY HIGH DYNAMIC STRENGTH

[75] Inventors: Otto Ganster; Jürgen Schwindt, both of Leverkusen, Fed. Rep. of Germany

[73] Assignee: Bayer Aktiengesellschaft, Leverkusen, Fed. Rep. of Germany

[21] Appl. No.: 178,230

[22] Filed: Aug. 14, 1980

[30] Foreign Application Priority Data

Aug. 16, 1979 [DE] Fed. Rep. of Germany ....... 2933165

[51] Int. Cl.³ .................... C08G 18/32; C08G 18/16; B28B 1/20
[52] U.S. Cl. .................... 264/311; 156/110 CL; 264/331.19; 528/64; 528/67; 528/49; 528/51; 528/53; 528/55
[58] Field of Search ................ 528/64, 67; 264/311, 264/331.19

[56] References Cited

U.S. PATENT DOCUMENTS

| | | | |
|---|---|---|---|
| 3,428,610 | 2/1969 | Klebert | 528/59 |
| 3,701,374 | 10/1972 | McGillvary | 528/64 |
| 3,794,621 | 2/1974 | Meckel et al. | 528/64 |
| 3,963,681 | 6/1976 | Kaneko et al. | 528/61 |
| 4,029,730 | 6/1977 | Schroeder | 528/59 |
| 4,096,101 | 6/1978 | Blahak et al. | 521/136 |
| 4,208,507 | 6/1980 | Stutz et al. | 528/67 |

FOREIGN PATENT DOCUMENTS 1534258 11/1978 United Kingdom .

*Primary Examiner*—H. S. Cockeram
*Attorney, Agent, or Firm*—Gene Harsh; Joseph C. Gil

[57] ABSTRACT

The instant invention is directed to a process for the production of pneumatic tires having particularly high dynamic strength and low plastic deformability comprising casting or centrifugally casting the following liquid reaction system whose rapid hardening requires temperatures of at most 85° C.:

(A) prepolymers or semiprepolymers of specified isocyanates and a polyol or polyol mixture having a hydroxyl functionality of 2.0 to 2.2 and an average molecular weight of from 1,000 to 3,000, wherein the molar ratio of polyol to diisocyanate is from 1:1.5 to 1:4.0, (B) specific aromatic diamine chain extenders, (C) catalysts, and (D) auxiliaries.

12 Claims, 1 Drawing Figure

PROCESS FOR THE PRODUCTION OF PNEUMATIC TIRES HAVING PARTICULARLY HIGH DYNAMIC STRENGTH

BACKGROUND OF THE INVENTION

This invention relates to the production of pneumatic tires from noncellular polyurea-polyurethane elastomers by casting, or centrifugally casting, liquid reaction systems.

The production of pneumatic tires based on polyurea-polyurethane casting systems is known. U.S. Pat. No. 4,029,730, for example, describes the production of a carcass sidewall using alkali metal salt complexes of 4,4'-diamino-diphenylmethane as chain extenders. With polypropylene oxide polyols, however, for example (as used in accordance with the present invention) chain extenders such as these do not give sufficiently favorable properties for pneumatic tires (cf. Tables 1 and 5A, Example 18). Another disadvantage lies in the high heating temperature (130° C.) required in the process according to the above-mentioned U.S. patent, whereas according to the present invention, it is possible to work with considerably lower mold and heating temperatures (50° to 80° C.).

U.S. Pat. No. 3,963,681 relates to the use of certain mixtures of polyether polyols for producing cast tires. These particular mixtures are distinguished by the fact that they contain at least one polyether, the molecular weight of which is greater than the "critical rheological molecular weight". Under this assumption, a particularly good, permanent flexural strength is attributed to the elastomers produced in accordance with the reference. However, it has been found that the use of long-chain polyol fractions basically leads to a marked increase in the plastic deformation of the tires in the high-speed test (see Table 4: Examples 7, 8 and 9; dyn. peripheral growth at end of test). Thus, the present invention differs essentially in the fact that the particular effect of minimal plastic deformation under dynamic stressing may only be obtained using polyols with molecular weights considerably below those of the reference.

German Offenlegungsschrift No. 2,633,457 (U.S. Pat. No. 4,096,101) describes the post-cross-linking of elastomers with reactive fillers for the purpose of improving their properties. Apart from other differences, this reaction step is avoided in the process according to the present invention. German Offenlegungsschrift No. 2,622,951 describes a process for producing elastic moldings on the one-shot principle. The high reactivity, however, typical of the one-shot processing of formulations containing aromatic diamines, prevents the production of commercially satisfactory tires by casting or centrifugal casting. In addition, the one-shot elastomers have excessive plastic deformability.

U.S. Pat. No. 3,428,610 discloses cross-linked polyurethanes prepared from prepolymers and aromatic diamines. Catalysts are not used and the advantages of the instant invention are not recognized.

Now, by virtue of the present invention, it is possible to produce pneumatic tires combining low plastic deformability with high dynamic strength by casting, or centrifugal casting, from polypropylene oxide polyols which are both inexpensive and readily obtainable. The formulations used in accordance with the present invention show medium reactivity which, on the one hand, enables large (tractor) tires to be produced and, on the other hand, also provides for in-mold times of only fifteen minutes or less, hardening taking place at mold and starting material temperatures of from 50° to 80° C.

A BRIEF DESCRIPTION OF THE DRAWING

The FIGURE shows a tire mold with a lost core of rigid polyurethane foam.

DESCRIPTION OF THE INVENTION

Accordingly, the present invention relates to a process for the production of pneumatic tires having particularly high dynamic strength and low plastic deformability comprising casting, or centrifugally casting, the following liquid reaction system whose rapid hardening requires temperatures of at most 85° C.:

(A) prepolymers or semiprepolymers of
  (i) an isocyanate selected from the group consisting of:
    (a) hexamethylene-1,6-diisocyanate,
    (b) 2,4- or 2,6-tolylene diisocyanate and mixtures thereof,
    (c) 4,4'- or 2,4'-diisocyanato-diphenylmethane and mixtures thereof, and
    (d) diisocyanato-diphenylmethane $C_1$–$C_4$ alkylated from one to four times in the ortho position to the NCO— groups and
  (ii) a polyol or polyol mixture having a hydroxyl functionality of 2.0 to 2.2 and an average molecular weight of 1,000 to 3,000 preferably 1,300 to 2,500, consisting of a single component or obtained by mixing several polyols having a molecular weight of 500 to 4,000, wherein the molar ratio of polyol to diisocyanate is from 1:1.5 to 1:4.0, preferably 1:1.5 to 1:3.0;

(B) aromtic diamine chain extenders selected from the group consisting of:

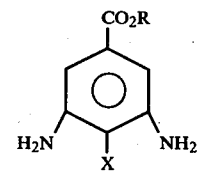

wherein
R is $C_nH_{2n+1}$,
n is an integer of from 4 to 10, preferably $C_4H_9$ and

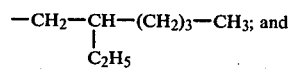

X is $CH_3$— or Cl;

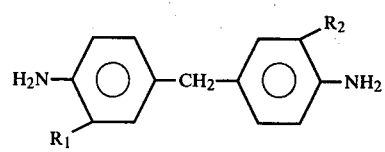

wherein $R_1$ and $R_2$, which may be the same or different, represent $C_2H_5$—, $C_3H_7$— and $C_4H_9$—, preferably $C_2H_5$—;

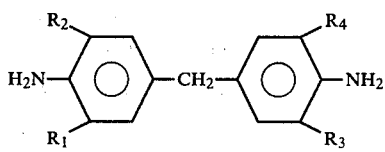

wherein $R_1$, $R_2$, $R_3$ and $R_4$, which may be the same or different, represent $C_2H_5$— and $C_3H_7$—, preferably $R_1$ and $R_2$ represent $C_2H_5$— and $R_3$ and $R_4$ represent $C_3H_7$—; and

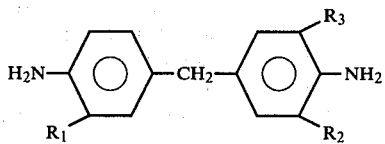

wherein $R_1$, $R_2$ and $R_3$, which may be the same or different, represent $C_2H_5$—, $C_3H_7$— and $C_4H_9$—, preferably $C_2H_5$—;

(C) catalyst; and
(D) auxiliaries.

The following are used as starting components for the process according to the present invention:

(1) NCO-prepolymers or semiprepolymers which have been obtained from a polyol or polyol mixture having an OH-functionality of from 2.0 to 2.2 and the polyisocyanates mentioned above. Of the polyisocyanates, 2,4- and 2,6-tolylene diisocyanate and mixtures of these isomers are particularly preferred, although 2,4'- and 4,4'-diisocyanato-diphenylmethane and mixtures of these isomers and diisocyanato-diphenylmethane $C_1$–$C_4$-alkylated from one to four times in the ortho position to the NCO— groups may also be used with advantage in accordance with the present invention. Mixtures of 2,4- and 2,6-tolylene diisocyanate containing at least 20% by weight of 2,6-isomer and mixtures of 2,4'- and 4,4'-diisocyanato-diphenylmethane containing at least 30% by weight of 2,4'-isomers are particularly preferred.

The following compounds may be used, optionally as mixtures, as diisocyanato-diphenylemthanes $C_1$–$C_4$-alkylated in the ortho position to the NCO-groups: (R, which may be the same or different, respresents $CH_3$, $C_2H_5$, $C_3H_7$, $C_4H_9$, preferably $CH_3$, $C_2H_5$, $C_3H_7$, more particularly $CH_3$, $C_2H_5$).

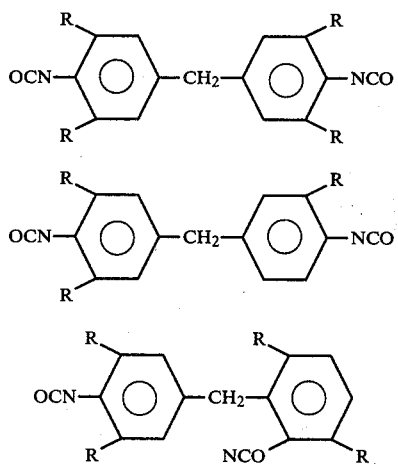

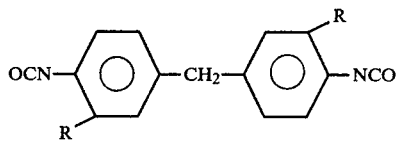

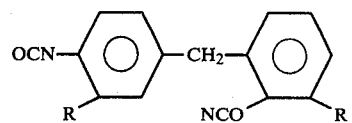

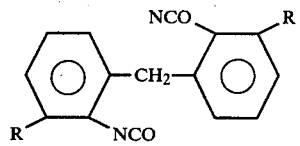

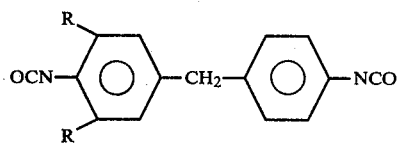

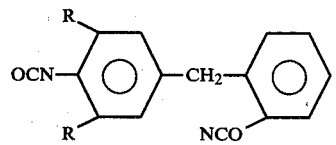

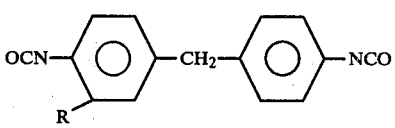

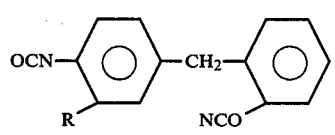

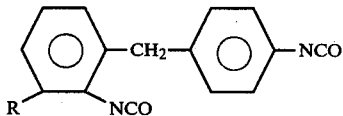

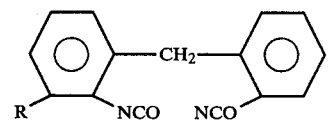

It is also possible to modify the above-mentioned polyisocyanates by the introduction of carbodiimide, urethane, allophanate, isocyanurate, urea and biuret groups.

The polyol or polyol mixtures to be reacted with the above-mentioned polyisocyanates to form the prepolymers or semiprepolymers have a hydroxyl functionality of 2.0 to 2.2 and an average molecular weight of from 1,000 to 3,000, preferably from 1,300 to 2,500 and consist either of a single component or are obtained by mixing several polyols having a molecular weight in the range of from 500 to 4,000. Suitable polyhydroxyl compounds are polyesters, polyethers, polythioethers, polyacetals, polycarbonates, poly(capro)lactones and polyester amides containing at least 2, generally from 2 to 4, hydroxyl groups of the type also described in detail, for example, in German Offenlegungsschrift No. 2,832,253, pages 11 to 18. Polyethers and poly(capro)lactones containing from 2 to 4 hydroxyl groups are particularly preferred. The polyhydroxyl compounds containing 3 or 4 hydroxyl groups are proportionately used in order to adjust the above-mentioned OH— functionality.

(2) As chain extenders (B), the following diamines may be used:

I:

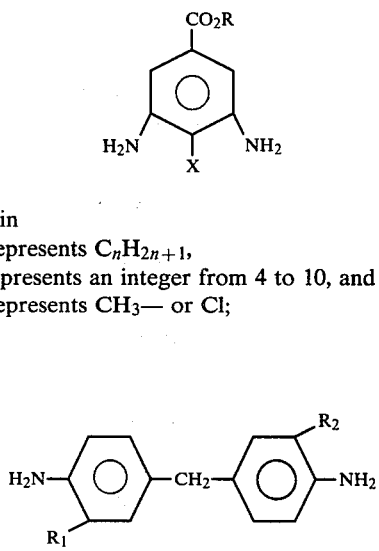

wherein
  R represents $C_nH_{2n+1}$,
  n represents an integer from 4 to 10, and
  X represents $CH_3$— or Cl;
or

II:

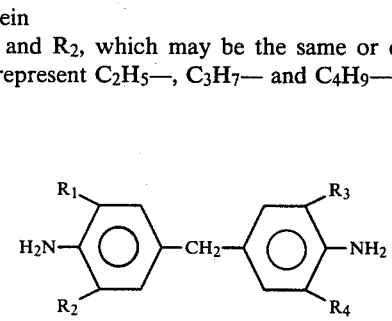

wherein
  $R_1$ and $R_2$, which may be the same or different, represent $C_2H_5$—, $C_3H_7$— and $C_4H_9$—;
or

III

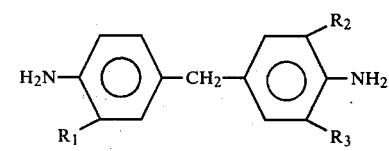

wherein $R_1$, $R_2$, $R_3$ and $R_4$, which may be the same or different, represent $C_2H_5$— and $C_3H_7$—;
or

IV

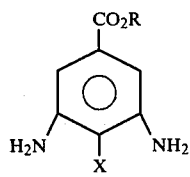

wherein $R_1$, $R_2$ and $R_3$, which may be the same or different, represent $C_2H_5$—, $C_3H_7$— and $C_4H_9$—.

The following compounds are preferably used in accordance with the present invention:

For I:

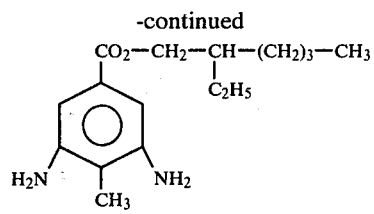

For II:

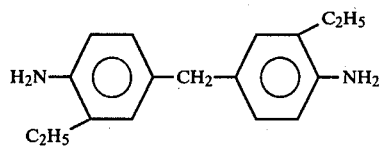

For III:

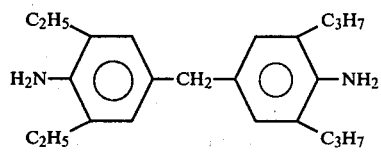

For IV:

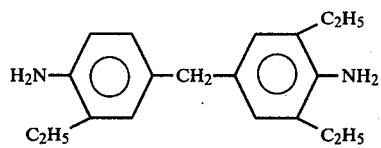

The following mixtures are also preferred:

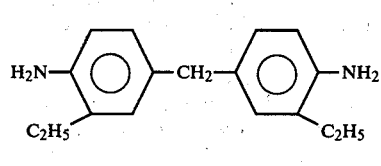

and

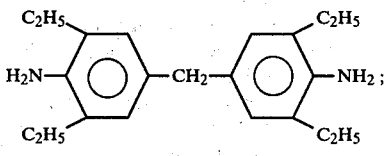

and

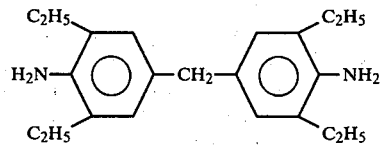

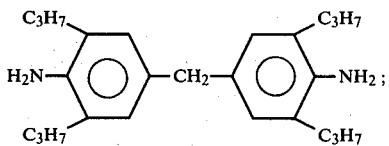

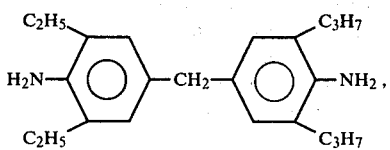

-continued

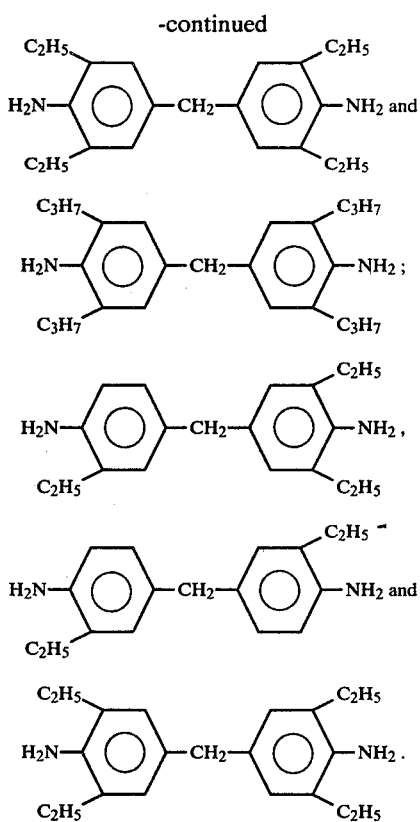

The chain-lengthening agents are normally used in an amount which corresponds to a molar $NCO/NH_2$-ratio of from 0.95:1 to 1.15:1 preferably of from 1:1 to 1.05:1.

(3) Catalysts (C) which may be used include inorganic or organic acids such as phosphoric acid, dibutyl phosphoric acid ester, oleic acid, stearic acid, benzoic acid, phthalic acid monoalkyl ester or adipic acid. It is also possible to use known catalysts (see German Offenlegungsschrift No. 2,830,949, pages 26–29), for example tertiary amines such as triethyl amine; tributyl amine; N-methyl morpholine; N-ethyl morpholine; N,N,N',N'-tetramethyl ethylene diamine; pentamethyl diethylene triamine and higher homologs (German Offenlegungsschriften Nos. 2,624,527 and 2,624,528); 1,4-diazabicyclo-(2,2,2)-octane; N-methyl-N'-dimethyl aminoethyl piperazine; bis-(dimethyl aminoalkyl)-piperazine (German Offenlegungsschrift No. 2,636,787); N,N-dimethyl benzyl amine; N,N-dimethyl cyclohexyl amine; N,N-diethyl benzyl amine; bis-(N,N-diethyl aminoethyl)-adipate; N,N,N',N'-tetramethyl-1,3-butane diamine; N,N-dimethyl-β-phenyl ethyl amine; 1,2-dimethyl imidazole; 2-methyl imidazole; monocyclic and bicyclic amidines (U.S. Pat. No. 3,330,782; German Auslegeschrift No. 1,030,558; German Offenlegungsschriften Nos. 1,804,361 and 2,618,280) and tertiary amines containing amide groups (preferably formamide groups) according to German Offenlegungsschriften Nos. 2,523,633 and 2,732,292. Other suitable catalysts are known Mannich bases of secondary amines (such as dimethyl amine) and aldehydes (preferably formaldehyde) or ketones (such as acetone, methyl ethyl ketone or cyclohexanone) and phenols (such as phenol, nonyl phenyl or bisphenol).

Tertiary amines containing isocyanate-reactive hydrogen atoms suitable for use as catalysts are, for example, triethanolamine; triisopropanolamine; N-methyl diethanolamine; N-ethyl diethanolamine and N,N-dimethyl ethanolamine. Also their reaction products with alkylene oxides (such as propylene oxide and/or ethylene oxide) may be used. Secondary tertiary amines according to German Offenlegungsschrift No. 2,732,292 may also be used.

Other suitable catalysts are sila-amines containing carbon-silicon bonds of the type described, for example, in German Pat. No. 1,229,290 (corresponding to U.S. Pat. No. 3,620,984), for example 2,2,4-trimethyl-2-silamorpholine and 1,3-diethyl aminoethyl tetramethyl disiloxane.

According to the present invention, it is also possible to use organometallic compounds, particularly organo tin compounds, as catalysts. In addition to sulfur-containing compounds such as di-n-octyl tin mercaptide (German Auslegeschrift No. 1,769,367 or U.S. Pat. No. 3,645,927), preferred organo tin compounds are tin(II) salts of carboxylic acids (such as tin(II) acetate, tin(II) octoate, tin(II) ethyl hexoate and tin(II) laurate) and the tin(IV) compounds (for example, dibutyl tin oxide, dibutyl tin dichloride, dibutyl tin diacetate, dibutyl tin dilaurate, dibutyl tin maleate or dioctyl tin diacetate).

All the above-mentioned catalysts may, of course, also be used as mixtures. Of particular interest in this respect are combinations of organo-metallic compounds and amidines, amino pyridines or hydrazinopyridines (German Offenlegungsschriften Nos. 2,434,185; 2,601,082 and 2,603,834).

Further representatives of catalysts which may be used in accordance with the present invention and information on the way in which they work can be found in Kunststoff-Handbuch, Volume VII, by Vieweg and Hochtlen, Carl-Hanser-Verlag, Munich 1966, for example on pages 96 to 102.

The catalysts are generally used in a quantity of from about 0.001 to 10% by weight, based on the total quantity of reaction mixture.

(4) Auxiliaries (D) which may be used include pigments or dyes and flameproofing agents, for example tris-chloroethyl phosphate, tricresol phosphate, ammonium phosphate and polyphosphate. Stabilizers against the effects of aging and weather, plasticizers, fungistatic and bacteriostatic substances and fillers (such as barium sulfate, kieselguhr, carbon black or whiting) may be present.

Further examples of additives and reaction retarders, stabilizers, flameproofing substances, plasticizers, dyes, fillers, fungistatic and bacteriostatic substances which may optionally be used in accordance with the present invention and information on the way in which these additives are used and on their respective modes of action can be found in Kunststoff-Handbuch, Volume VII, by Vieweg and Hochtlen, Carl-Hanser-Verlag, Munich 1966, for example on pages 103 to 113.

The process according to the present invention is carried out as follows:

The reaction components are reacted by the prepolymer process or by the semiprepolymer process, often using machines. The reaction of the prepolymer or semi-prepolymers with the aromatic diamines is carried out at starting material and mold temperatures of from 50° to 80° C. in high pressure metering units with forced stirrerless mixing, optionally followed by static or (in the case of centrifugal casting) dynamic mixing.

The prepolymers or semiprepolymers obtained from hexamethylene-1,6-diisocyanate are preferably reacted with the diamines of general formula III, while the prepolymers or semipropolymers obtained from 4,4'- or 2,4'-diisocyanato-diphenylmethane and from mixtures thereof are preferably reacted with the diamines of general formula I.

The moldings may be removed from the mold after from 5 to 30 minutes depending on the catalysts used. To obtain optimum mechanical strength, the moldings generally have to be tempered for eight hours at from 80° to 110° C.

Information on processing machines which may also be used in accordance with the present invention can be found in Kunststoff-Handbuch, Volume VII, by Vieweg and Hochtlen, Carl-Hanser-Verlag, Munich 1966, for example on pages 121 to 205.

External release agents such as silicone oils, paraffin waxes or metal soaps are generally used. It is also possible, however, to use internal release agents, optionally in admixture with external release agents of the type described, for example, in German Offenlegungsschriften Nos. 2,121,670 and 2,307,589.

TEST PROCEDURE

The Examples are characterized by:
(a) physical-technological property values determined on test panels, and
(b) test-stand measurements on reinforced and nonreinforced tires.

The test panels were produced using the following parameters:
Panel thickness: 2 mm/6 mm;
Mold temperature: 80° C.;
Machine: EZ 3/12 (Hennecke GmbH, 5205 St. Augustin 1).

In some of the cases where hardening of the reaction mixture was slow, hand mixing (propeller stirrer) was used.

The production of the tires involved the following parameters:
Size: 175-14;
Profile: summer profile;
Mold: segmented steel mold;
Process: centrifugal casing using a horizontally rotating mold, 300 r.p.m., lost core of rigid polyurethane foam;
Release agent: polyethylene wax mixture dissolved in an organic solvent [Acmosil 180 ST (a product of the Acmos Company, D 2800 Bremen 1, Postfach 833)];
Metering and mixing unit: home-made machine for high pressure metering with forced stirrerless mixing pumps: Bosch in-line piston pumps, mixing head: 4-nozzle mixing head of the type manufactured by Krauss-Maffei AG, Krauss-Maffei-Str. 2, 8000 Munich 50;
Heating: pumps, pipes and mixing head fully heatable;
Note: hand mixing (propeller stirrer) was used when hardening of the reaction mixture was slow;
Reinforcement: a few layers of polyester cord are wound onto the rigid polyurethane core before it is introduced into the mold cavity.

The FIGURE shows a tire mold with a lost core of rigid polyurethane foam, reinforcement and bead cable. In the FIGURE:
(1)=parts of the outer mold;
(2)=lost core of rigid polyurethane foam;
(3)=sprue cone;
(4)=reinforcement;
(5)=bead cable.

Panel Tests

Tensile test: DIN 53504
Modulus at 100% elongation: $\sigma 100$
Modulus at 300% elongation: $\sigma 300$
Tensile strength: $\sigma B$
Breaking elongation: $\epsilon B$
Tear Propagation test: DIN 53515
Hardness: DIN 53505
Elasticity: DIN 53512
Trend of the shear modulus (G') as a function of temperature (T): DIN 53445
Shear modulus at 20° C.
Attenuation (tan $\delta$) at 20° C.
Maximum attenuation: $T_{tan\,\delta\,(max.)}$
Minimum attenuation: $T_{tan\,\delta\,(min.)}$ Tire Tests Test conditions in accordance with the high speed test for automobile tires of the U.S. Department of Transportation (DOT 109):

| | |
|---|---|
| Load | 460 kg (30 kg tires and rims); |
| Pressure | 2.0 bars; |
| Speed | 120 km/h - duration: 30 minutes |
| | 128 km/h 30 minutes |
| | 136 km/h 30 minutes, etc.; |
| Required value | 160 km/h - 180 minutes* total running time |
| Drum diameter | 2000 mm; |
| Room temperature | 30–38° C. |

*In the case of the nonreinforced tires of Tables 1 and 2, the speed was, where possible, increased at 30-minute intervals beyond the required value up to the point of failure.

DESCRIPTION AND FUNCTIONS OF THE EXAMPLES

Table 1: Summary of the formulations used in Examples 5 to 24;
Table 2: Examples 1 and 2 investigate the performance of conventional polyurethane elastomers in nonreinforced tires;
Table 3: Examples 3 to 6 give the results obtained with nonreinforced tires based on polyols or polyol mixtures according to the present invention;
Table 4: Examples 7, 8, 9 and 10 give results obtained with reinforced tires based on polypropylene oxide mixtures according to the present invention;
Table 5A: Examples 7, 12, 13 and 19 to 24 describe a selection of chain extenders suitable for use in accordance with the present invention with reference to panel test data, while Examples 11, 14, 15, 16, 17 and 18 are examples of unsuitable chain extenders;
Table 5B: Examples 7, 12, 19 and 20 describe chain extenders suitable for use in accordance with the present invention with reference to test data obtained from reinforced tires. Example 11 is an example of unsuitable chain extender.

EXAMPLES

Example 1

Reaction mixture:
Polyethylene adipate (molecular weight 2000): 100 pbw
1,5-naphthylene diisocyanate: 27 pbw
1,4-butane diol: 6.2 pbw;

Index: ($\overline{n}$NCO equivalents/$\overline{n}$OH equivalents) = 1.08.

Processing:

The polyethylene adipate is dried in vacuo at 130° C. to a water content of less than 0.05%. The isocyanate is then added in flake form with stirring. The mixture is then stirred in vacuo until the maximum temperature is exceeded, after which 1,4-butane diol is added and the mixture homogenized by hand using a propeller stirrer (30 to 40 seconds). It is important to ensure that no air bubbles are introduced. The reaction mixture then has to be poured into the mold heated to 110° C. in 90 seconds. After 15 hours, the mold may be opened, after which the molding is tempered for another 24 hours at 110° C.

Example 2

Prepolymer:
  Polyethylene adipate (molecular weight 2000): 1.0 mol
  1,4-diphenylmethane diisocyanate: 4.6 mols
  NCO content: 9.5%
Chain extender: 1,4-butane diol
Mixing ratio of prepolymer/chain extender is 100 pbw/9.68 pbw
Index: ($\overline{n}$NCO (prepolymer)/$\overline{n}$OH) = 1.03
Production of the prepolymer:
  The polyethylene adipate is dried in vacuo at 120° C. to a water content of less than 0.05%. After cooling to 60°–70° C., the polyol is stirred into the isocyanate, introduced beforehand in vacuo at the same temperature at such a rate that the temperature prevailing in the reaction mixture can be kept in the range of from 70° to 80° C. On completion of the addition, the mixture is stirred for another three hours at from 70° to 80° C.
Processing, by hand mixing with a propeller stirrer:
  Addition temperature of the prepolymer: 75° C.
  Addition temperature of the butane diol: room temperature
  Stirring time: 40 seconds
  Pouring time: 100 seconds
  Mold temperature: 110° C.
  In-mold time: 15 hours
  Tempering conditions: 24 hours/110° C.

Example 3

Prepolymer:
  Polytetrahydrofuran (molecular weight 1000): 0.5 mol
  Polytetrahydrofuran (molecular weight 2000): 0.5 mol
  2,4-tolylene diisocyanate: 2.6 mols
  NCO content: 4.8%
  Catalyst (dibutyl phosphate): 0.3%
Chain extender: 4-chloro-3,5-diamino benzoic acid isobutyl ester
Mixing ratio of prepolymer/chain extender is 100 pbw/13.4 pbw
Index: ($\overline{n}$NCO (prep.)/$\overline{n}$NH$_2$) = 1.03
Production of the prepolymer: same as Example 2
Processing, by hand mixing with a propeller stirrer:
  Addition temperature of the prepolymer: 95° C.
  Addition temperature of the chain extender: 100° C.
  Stirring time: 60 seconds
  Pouring time: 100 seconds
  Mold temperature: 110° C.
  In-mold time: 5 hours
  Tempering conditions: 12 hours/100° C.

Example 4

Prepolymer:
  Polyethylene adipate (molecular weight 2000): 1.0 mol
  2,4-tolylene diisocyanate: 2.1 mols
  NCO content: 3.9%
  Catalysts (dibutyl phosphate): 0.3%
Chain extender: 4-chloro-3,5-diamino benzoic acid isobutyl ester
Mixing ratio of prepolymer/chain extender is 100 pbw/10.9 pbw
Index: ($\overline{n}$NCO (prep.)/$\overline{n}$NH$_2$) = 1.03
Production of the prepolymer: same as Example 2
Processing, propeller stirrer, hand mixing:
  Addition temperature of the prepolymer: 80° C.
  Addition temperature of the chain extender: 85° C.
  Stirring time: 30 seconds
  Pouring time: 100 seconds
  In-mold time: 5 hours
  Tempering conditions: 12 hours/100° C.

Examples 5 to 24

Prepolymers:
  The structure of the prepolymers based on difunctional polypropylene oxide polyols as used in Examples 5 to 24 is listed in Table 1. The prepolymers are produced in the same way as described in Example 2.
Chain extenders:
  The chain extenders are identified by the Roman numerals I–XI in Table 1:
  I: 4-chloro-3,5-diamino benzoic acid isobutyl ester
  II: 4-methyl-3,5-diamino benzoic acid-(2-ethyl hexyl)-ester
  III: diethyl tolamine
  IV: 4-methyl-3,5-diamino benzoic acid isobutyl ester
  V: 3,3'-dichloro-4,4'-diamino diphenylmethane (MOCA)
  VI: 3,3'-bis-carbethoxy-4,4'-diamino diphenylmethane
  VII: 3,3'-bis-ethoxy-4,4'-diamino diphenylmethane
  VIII: 3,3'-bis-methyl mercapto-4,4'-diamino diphenylmethane
  IX: 4,4'-diamino diphenylemthane (MDA) as (MDA)$_3$ . NaCl complex in the form of a 50% by weight dispersion in dioctyl phthalate
  X: a mixture of 60% by weight of 3,5-diethyl-3',5'-diisopropyl-4,4'-diamino diphenylmethane, 20% by weight of 3,5,3',5'-tetraethyl-4,4'-diamino diphenylmethane, 20% by weight of 3,5,3',5'-tetraisopropyl-4,4'-diamino diphenylmethane
  XI: 3,3'-diethyl-4,4'-diamino diphenylmethane.
Mixing ratios: see Table 1.
  Table 1 shows the quantity by weight of chain extender which is required for 100 parts by weight of prepolymer.
Index: ($\overline{n}$NCO (prep.)/$\overline{n}$NH$_2$) = 1.03
Processing: see Table 1
  The chain extenders I, V, VI and IX enable the reaction mixtures to be manually processed.
  The other chain extenders require machine processing.

TABLE 1

Formulations and processing of the Examples based on polypropylene oxide polyols

| | Structures of the Prepolymers | | | | | | Chain Extender | | Temperatures (°C.) | | | Mold Release | |
|---|---|---|---|---|---|---|---|---|---|---|---|---|---|
| | Polyol | | MW polyol mixture | Isocyanate | | % NCO | Product | Quantity per 100 g of prepolymer (g) | Prepolymer | Chain Extender | Mold | Tires (h) | Panel (mins.) |
| Example | MW | (mols) | | | (mols) | | | | | | | | |
| 5 | 1000 | 1.0 | — | 2,4-TDI | 1.77 | 5.0 | I | 14.0 | 70 | 90 | 85 | 3 | 20 |
| 6,12 | 1000 2000 | (0.6) (0.4) | 1400 | " | 2.0 | 4.7 | I | 13.2 | 70 | 90 | 85 | 3 | 20 |
| 7 | " | " | " | " | " | " | II | 15.1 | 70 | 50 | 70 | 0.5 | 8 |
| 11 | " | " | " | " | " | " | III | 9.7 | 70 | 25 | 70 | 0.5 | 8 |
| 13 | " | " | " | " | " | " | IV | 12.1 | 70 | 80 | 70 | 0.5 | 8 |
| 14 | " | " | " | " | " | " | V | 14.4 | 90 | 110 | 110 | — | 30 |
| 15 | " | " | " | " | " | " | VI | 18.6 | 70 | 100 | 110 | — | 30 |
| 16 | " | " | " | " | " | " | VII | 15.5 | 70 | 50 | 80 | — | 30 |
| 17 | " | " | " | " | " | " | VIII | 15.8 | 70 | 80 | 80 | — | 30 |
| 18 | " | " | " | " | " | " | IX | 23.8 | 70 | 70 | 120 | — | 60 |
| 19 | " | " | " | " | " | " | X | 18.4 | 60 | 50 | 70 | 0.5 | 5 |
| 20 | " | " | " | " | " | " | XI | 13.8 | 60 | 50 | 70 | 0.5 | 5 |
| 8 | 1000 4000 | (0.7) (0.3) | 1900 | " | 2.29 | 4.7 | II | 15.1 | 60 | 50 | 80 | 0.5 | 8 |
| 9 | 1000 4000 | (0.5) (0.5) | 2500 | " | 2.66 | 4.7 | II | 15.1 | 60 | 50 | 80 | 0.5 | 8 |
| 10 | 1500 | 1.0 | — | " | 2.04 | 4.7 | II | 15.1 | 60 | 50 | 70 | 0.5 | 8 |
| 21 | 1000 2000 | (0.6) (0.4) | 1400 | 2,4-,2,6-TDI 80/20 | 2.0 | 4.7 | X | 18.4 | 60 | 50 | 70 | — | 5 |
| 22 | " | " | " | 2,4-,2,6-TDI 40/60 | 2.0 | 4.7 | X | 18.4 | 60 | 50 | 70 | — | 8 |
| 23 | " | " | " | HDI | 2.0 | 4.8 | X | 18.8 | 60 | 50 | 80 | — | 10 |
| 24 | " | " | " | 4,4'-,2,4'-MDI 60/40 | 2.0 | 3.7 | X | 13.0 | 60 | 50 | 70 | — | 5 |

TABLE 2

Examples of tires of conventional elastomers, nonreinforced

| Example | Polyol | Average molecular weight of the polyol | Isocyanate | NCO-content of the prepolymer | Chain Extender | Dyn. peripheral growth (%) after 30 mins/120 km/h | Dyn. peripheral growth (%) at end of test | Running time (mins.) | Defect |
|---|---|---|---|---|---|---|---|---|---|
| 1 | polyethylene adipate | 2000 | NDI | — | 1,4-butane diol | 2.0 | 5.6 | 280 | destroyed |
| 2 | polyethylene adipate | 2000 | MDI | 9.5% | 1,4-butane diol | 2.8 | 4.5 | 140 | destroyed |

TABLE 3

Examples of polyols suitable for use in accordance with the present invention, nonreinforced tires

| Example | Molecular weight of the polyols | Average molecular weight of the polyol mixture | Isocyanate | NCO-content of the prepolymer | Chain Extender | Dyn. peripheral growth (%) after 30 mins/120 km/h | Dyn. peripheral growth (%) at end of test | Running time (mins.) | Defect |
|---|---|---|---|---|---|---|---|---|---|
| 3 | polytetrahydrofuran MW 1000+ MW 2000 | 1500 | 2,4-TDI | 4.8% | 4-chloro-3,5-diamino benzoic acid isobutyl ester | 3.9 | 4.4 | 59 | destroyed |
| 4 | polyethylene adipate | 2000 | 2,4-TDI | 3.6% | 4-chloro-3,5-diamino benzoic acid isobutyl ester | 4.8 | 6.2 | 61 | destroyed |
| 5 | 1000 | — | 2,4-TDI | 5.0% | 4-chloro-3,5-diamino benzoic acid isobutyl ester | 1.9 | 5.5 | 240 | destroyed |
| 6 | 1000+ 2000 | 1400 | 2,4-TDI | 4.8% | 4-chloro-3,5-diamino benzoic acid isobutyl ester | 2.8 | 8.0 | 260 | destroyed |

TABLE 4

Influence of the polyol molecular weight on reinforced tires

| Example | Molecular weight of the polyols | Average molecular weight of the polyol mixture | Isocyanate | NCO-content of the prepolymer | Chain extender | Dyn. peripheral growth (%) after 30 mins/120 km/h | Dyn. peripheral growth (%) at end of test | Running time (mins.) | Defect |
|---|---|---|---|---|---|---|---|---|---|
| 7 | 1000+ 2000 | 1400 | 2,4-TDI | 4.7% | 4-methyl-3,5-diamino benzoic acid-(2-ethyl-hexyl)-ester | 1.3 | 1.9 | 180 | — |
| 8 | 1000+ 4000 | 1900 | 2,4-TDI | 4.7% | 4-methyl-3,5-diamino benzoic acid-(2-ethyl-hexyl)-ester | 1.1 | 2.9 | 180 | — |
| 9 | 1000+ 4000 | 2500 | 2,4-TDI | 4.7% | 4-methyl-3,5-diamino benzoic acid-(2-ethyl-hexyl)-ester | 1.3 | 4.0 | 180 | — |
| 10 | 1500 | — | 2,4-TDI | 4.7% | 4-methyl-3,5-diamino benzoic acid-(2-ethyl-hexyl)-ester | 1.0 | 2.0 | 180 | — |

TABLE 5A

Examples of the selection of chain extenders according to the present invention

| Example | 11 | 12(6) | 7 | 13 | 14 | 15 | 16 | 17 | 18 | 19 | 20 | 21 | 22 | 23 | 24 |
|---|---|---|---|---|---|---|---|---|---|---|---|---|---|---|---|
| Structure of the prepolymer | Polyols: MW 1000: 0.6 mol; MW 2000: 0.4 mol; $\overline{MW}$ = 1400 | | | | | Isocyanate (2,4-TDI): 2.0 mols; NCO content: 4.7% | | | Isocyanate (2,4-TDI): 2.0 mols; NCO content: 4.7% | | | | | | |
| Chain extender | III | I | II | IV | V | VI | VII | VIII | IX | X | XI | X | X | X | X |
| Tensile test (DIN 53504) 100% (MPa) | 5.26 | 8.03 | 7.08 | 8.56 | 3.64 | 3.07 | 1.74 | 3.86 | 0.80 | 6.95 | 8.12 | 8.13 | 10.6 | 5.99 | 5.23 |
| 300% (MPa) | 8.36 | 9.97 | 8.86 | 9.91 | 5.63 | 4.41 | 4.11 | 5.91 | 1.24 | 8.00 | 8.56 | 10.7 | 12.3 | 7.79 | 7.31 |
| Tensile test (MPa) | 32.0 | 20.5 | 24.7 | 28.6 | 11.6 | 9.25 | 22.7 | 19.2 | 5.30 | 26.2 | 22.1 | 26.7 | 25.3 | 16.0 | 28.0 |
| Breaking elongation (%) | 626 | 501 | 566 | 585 | 629 | 698 | 523 | 611 | 711 | 635 | 607 | 532 | 599 | 552 | 694 |
| Tear propagation resistance (DIN 53515) (kN/m) | 36.0 | 37.5 | 36.0 | 55.7 | 29.4 | 26.1 | 45.0 | 44.3 | 11.5 | 53.9 | 56.8 | 44.7 | 62.2 | 29.0 | 45 |
| Shore-A hardness (DIN 53505) | 83 | 88 | 87 | 92 | 83 | 76 | 64 | 81 | 48 | 89 | 91 | 91 | 95 | 89 | 83 |
| Elasticity (DIN 53512) (%) | 51 | 41 | 50 | 47 | 40 | 26 | 16 | 28 | 16 | 43 | 47 | 38 | 44 | 55 | 40 |
| Shear Modulus 20° C. (DIN 53445) (MPa) | 7.75 | 27 | 14 | 25 | — | — | 3.58 | 16.7 | 1.4 | 23 | 24.5 | — | 57.7 | 25.5 | — |
| Attenuation (tan δ) (20° C.) | 0.061 | 0.092 | 0.059 | 0.12 | — | — | 0.53 | 0.17 | 0.41 | 0.089 | 0.078 | — | 0.065 | 0.040 | — |
| Maximum attenuation (°C.) | −25 | −35 | −30 | −30 | — | — | +10 | −10 | +6 | −30 | −32 | — | −32 | −42 | — |
| Minimum attenuation (°C.) | +70 | +140 | +70 | +100 | — | — | +110 | +130 | +70 | +100 | +100 | — | +110 | +95 | — |
| Suitability | − | +* | + | + | − | − | − | − | − | + | + | + | + | + | + |

+ = suitable as chain extenders.
− = unsuitable as chain extenders.
* = may not be used in accordance with the present invention because of the inadequate hardening rate.

TABLE 5B

Examples of the selection of chain extenders according to the present invention, reinforced tires

| Example | Molecular weight of the polyols | Average molecular weight of the polyol mixture | Isocyanate | NCO-content of the prepolymer | Chain Extender | Dyn. peripheral growth (%) after 30 mins/120 km/h | Dyn. peripheral growth (%) at end of test | Running time (mins.) | Defect |
|---|---|---|---|---|---|---|---|---|---|
| 11 | 1000+ 2000 | 1400 | 2,4-TDI | 4.7% | diethyl tolamine | — | 2.7 | 25 | seriously out of balance |
| 12 | 1000+ 2000 | 1400 | 2,4-TDI | 4.7% | 4-chloro-3,5-diamino benzoic acid isobutyl ester | 1.0 | — | 180 | — |
| 7 | 1000+ | 1400 | 2,4-TDI | 4.7% | 4-methyl-3,5- | 1.3 | — | 180 | — |

TABLE 5B-continued

Examples of the selection of chain extenders according to the present invention, reinforced tires

| Example | Molecular weight of the polyols | Average molecular weight of the polyol mixture | Isocyanate | NCO-content of the prepolymer | Chain Extender | Dyn. peripheral growth (%) after 30 mins/120 km/h | Dyn. peripheral growth (%) at end of test | Running time (mins.) | Defect |
|---|---|---|---|---|---|---|---|---|---|
|  | 2000 |  |  |  | diamino benzoic acid-(2-ethyl-hexyl)-ester |  |  |  |  |
| 19 | 1000+ 2000 | 1400 | 2,4-TDI | 4.7% | 3,5-diethyl-3',5'-diiso-propyl-4,4'-diamino diphenylmethane | 1.0 | — | 180 | — |
| 20 | 1000+ 2000 | 1400 | 2,4-TDI | 4.7% | 3,3'-diethyl-4,4'-diamino diphenylmethane | 0.9 | — | 180 | — |

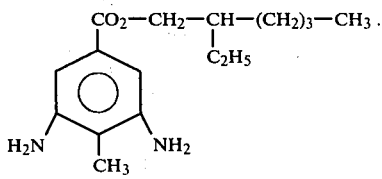

What is claimed is:

1. A process for the production of pneumatic tires having particularly high dynamic strength and low plastic deformability comprising casting, or centrifugally casting, the following liquid reaction system whose rapid hardening requires temperatures of at most 85° C.:

(A) prepolymers or semiprepolymers of
  (i) an isocyanate selected from the group consisting of:
    (a) hexamethylene-1,6-diisocyanate,
    (b) 2,4- or 2,6-tolylene diisocyanate and mixtures thereof,
    (c) 4,4'- or 2,4'-diisocyanato-diphenylmethane and mixtures thereof, and
    (d) diisocyanato-diphenylmethane $C_1$–$C_4$ alkylated from one to four times in the ortho position to the NCO-groups and
  (ii) a polyol or polyol mixture, having a hydroxyl functionality of 2.0 to 2.2 and an average molecular weight of 1,000 to 3,000 consisting of a single component or obtained by mixing several polyols having a molecular weight of 500 to 4,000,
wherein the molar ratio of polyol to diisocyanate is from 1:1.5 to 1:4.0;

(B) aromatic diamine chain extenders selected from the group consisting of:

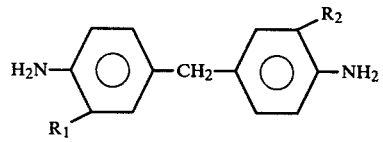

(i)

wherein $R_1$ and $R_2$, which may be the same or different, represent $C_2H_5$—, $C_3H_7$— and $C_4H_9$—;

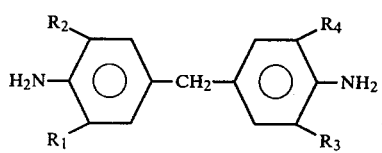

(ii)

wherein $R_1$, $R_2$, $R_3$ and $R_4$, which may be the same or different, represent $C_2H_5$— and $C_3H_7$—; and

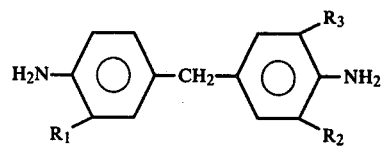

(iii)

wherein $R_1$, $R_2$ and $R_3$, which may be the same or different, represent $C_2H_5$—, $C_3H_7$— and $C_4H_9$—

(C) catalyst; and
(D) auxiliaries.

2. The process of claim 1, wherein said polyols have a molecular weight of 1,300 to 2,500 and wherein the molar ratio of polyol to isocyanate is from 1:1.5 to 1:3.0.

3. The process of claim 1, wherein said aromatic diamine chain extender is:

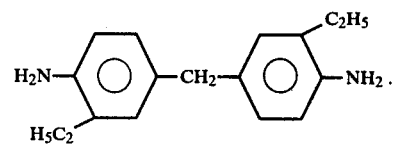

4. The process of claim 1, wherein said aromatic diamine chain extender is:

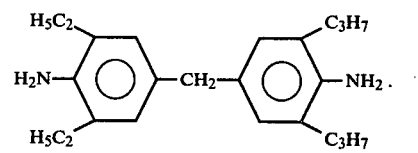

5. The process of claim 1, wherein said aromatic diamine chain extender is:

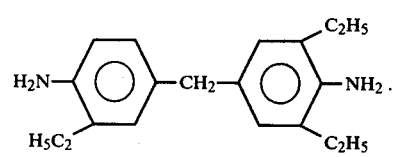

6. The process of claim 1, wherein hardening takes place at a temperature of from 50° to 85° C.

7. The process of claim 1, wherein said aromatic diamine chain extender is a mixture of the following diamines:

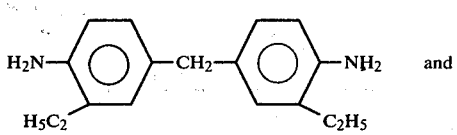

and

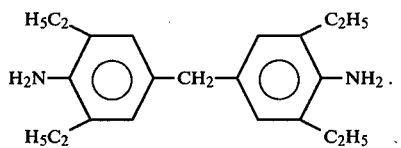

8. The process of claim 1, wherein said aromatic diamine chain extender is a mixture of the following diamines:

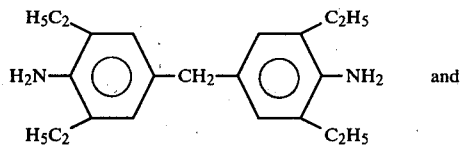

and

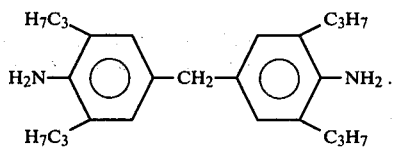

9. The process of claim 1, wherein said aromatic diamine chain extender is a mixture of the following diamines:

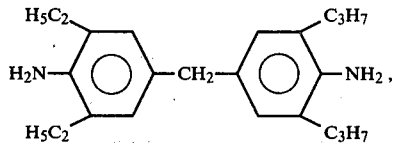

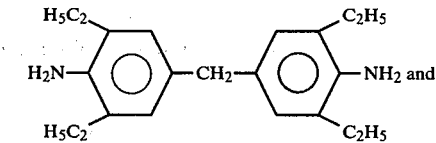

and

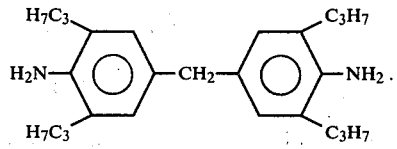

10. The process of claim 1, wherein said aromatic diamine chain extender is a mixture of the following diamines:

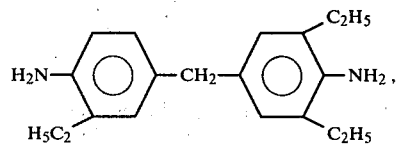

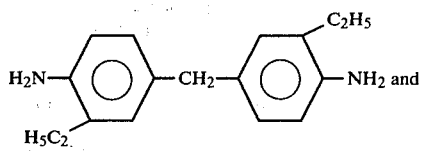

and

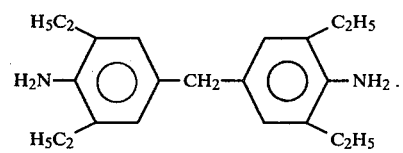

11. A process for the production of penumatic tires having particularly high dynamic strength and low plastic deformability comprising casting, or centrifugally casting, the following liquid reaction system whose rapid hardening requires temperatures of at most 85° C.:
(A) prepolymers or semiprepolymers of
  (i) an isocyanate selected from the group consisting of:
    (a) hexamethylene-1,6-diisocyanate,
    (b) 2,4- or 2,6-tolylene diisocyanate and mixtures thereof,
    (c) 4,4'- or 2,4'-diisocyanato-diphenylmethane and mixtures thereof, and
    (d) diisocyanato-diphenylmethane $C_1$–$C_4$ alkylated from one to four times in ortho position to the NCO-groups and
  (ii) a polyol or polyol mixture, having a hydroxyl functionality of 2.0 to 2.2 and an average molecular weight of 1,000 to 3,000 consisting of a single component or obtained by mixing several polyols having a molecular weight of 500 to 4,000, wherein the molar ratio of polyol to diisocyanate is from 1:1.5 to 1:4.0;
(B) an aromatic diamine chain extender of the general formula:

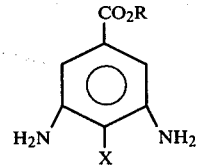

wherein
R is $C_nH_{2n+1}$,
n is an integer of from 4 to 10, and
X is $CH_3$— or Cl;
(C) catalyst; and
(D) auxiliaries.

12. The process of claim 11, wherein said aromatic diamine chain extender is: